United States Patent [19]

Steiner

[11] 3,994,431

[45] Nov. 30, 1976

[54] METHOD FOR ANCHORAGE AND SPLICING OF WIRES ON WIRE-WRAPPED CYLINDRICAL PRESTRESSED STRUCTURES

[75] Inventor: John E. Steiner, Edgewood Borough, Allegheny County, Pa.

[73] Assignee: United States Steel Corporation, Pittsburgh, Pa.

[22] Filed: Dec. 10, 1975

[21] Appl. No.: 639,329

[52] U.S. Cl. .................... 228/153; 228/154; 228/164; 228/184; 228/904

[51] Int. Cl.² .................... B23K 31/02

[58] Field of Search .............. 29/241; 228/153, 154, 228/164, 184, 904; 140/111, 112; 220/71, 3

[56] References Cited

UNITED STATES PATENTS

| | | | |
|---|---|---|---|
| 586,179 | 7/1897 | Hamlin | 220/3 |
| 3,025,992 | 3/1962 | Humphery | 220/71 X |

*Primary Examiner*—Richard B. Lazarus

*Attorney, Agent, or Firm*—Forest C. Sexton

[57] ABSTRACT

In the production of wire-wrapped pressure vessels and pipe the ends of the wire are anchored or spliced by welding the end hoop to the next adjoining hoop, while the stresses in those hoops subjected to welding are minimized by providing a greater wire density adjacent thereto and hence reduced tension in the welded hoops.

12 Claims, 5 Drawing Figures

METHOD FOR ANCHORAGE AND SPLICING OF WIRES ON WIRE-WRAPPED CYLINDRICAL PRESTRESSED STRUCTURES

BACKGROUND OF THE INVENTION

Wrapping wire around a cylindrical vessel or pipe has long been used both as a means of reinforcement and as a means of prestressing the wrapped structure. It is well known, therefore, that when a cylindrical vessel or pipe is subjected to an internal pressure, the circumferential shell stresses are exactly twice the longitudinal shell stresses. A tightly wrapped circumferential wire therefore will share the circumferential load to reduce the circumferential shell stresses by an amount equal to the tensile stresses in the wire. Hence, the pressure holding capacity of a given cylindrical vessel or pipe can be doubled by suitable wire wrapping without endangering the safety of the structure in the longitudinal direction.

Besides offering an efficient approach to essentially doubling the pressure rating of a given vessel or pipe, wire wrapping also offers significant advantages with respect to resisting catastrophic fracture. That is to say, once a failure has occurred, as by piercing, the wire wrapping will serve to minimize displacement and strain in the shell wall to minimize crack propagation and complete bursting of the structure.

Although many wire wrapping techniques and designs have been used and proposed for both vessels and line pipe, anchoring the wire to the shell has always been somewhat of a problem. Typically, the wire is anchored in such a manner that the end thereof is held mechanically to a bracket or some metallic anchoring structure which is welded, bolted or somehow affixed to the shell. All such anchors have the common attribute of presenting some protrusion of metal above the general surface of the wire wrapping. In such structures as prestressed concrete pipe, such protrusions are of little consequence because the wires and the protrusions are subsequently covered with a gunite cement coating. In the case of line pipe and pressure vessels, however, the protrusions, whether large or small, can be troublesome in that they may be jarred and damaged during handling. Although it has been proposed that such protrusions can be eliminated by welding the wire ends to the vessel or pipe shell, such a solution has not been deemed practical because the high tensile strength wire does not lend itself to welding. That is to say, to optimize the advantages of wire wrapping, it is of course desired that hard-drawn high tensile strength wire be used. If this wire is welded, the resulting heat will effectively temper the wire to substantially reduce its tensile strength. In addition, the current trend, particularly for low temperature applications, is to utilize line pipe and vessel shells having an increased tensile strength due to suitable heat treatment. Welding a wire thereto would also cause a localized weakening of the shell in the heat affected zone. In welding the wire to the shell, therefore, one may lose more than he gains by wire wrapping.

SUMMARY OF THE INVENTION

This invention is predicated upon my development of a method for welding high tensile strength wire to secure an end thereof to the shell of a cylindrical vessel or line pipe in such a manner that the overall pressure carrying capacity of the wire wrapped structure is not adversely affected by the weld. Hence, a simplified wire wrapped structure can be produced without the need for costly mechanical wire anchors, and the protrusions such anchors normally provide, and without sacrificing the pressure capacity of the structure. The inventive method involves welding one circumferential hoop of the wire to the abutting hoop at a selected location along the shell where stresses are at a minimum, and without heating the shell, and varying the pitch of the wire hoops so that the tension in those hoops near the weld joint is minimized. In a like manner, splices can be made to join one wire to another.

Accordingly, an object of this invention is to provide a method for anchoring the end of a wire wrapped around a cylindrical vessel or pipe without using a mechanical anchoring means which protrudes above the surface of the wire.

Another object of this invention is to provide a method for welding the ends of a wire, wrapped around a cylindrical vessel or pipe, without heating the shell sufficiently to temper its microstructure.

A further object of this invention is to provide a process for making a wire wrapped, high pressure vessel having no wire anchor protrusions thereon.

Still another object of this invention is to provide a method for continuously wrapping a wire around a line pipe, including splicing one length of wire to the next without having anchor protrusions thereon.

Another object of this invention is to provide a wire wrapped high pressure vessel wherein the ends of the wire are held in place by weldings which do not adversely affect the pressure capacity of the vessel.

Still a further object of this invention is to provide a wire wrapped high pressure line pipe wherein the ends of the wire and splices are held in place by weldings which do not adversely affect the pressure capacity of the line pipe.

DESCRIPTION OF THE PREFERRED EMBODIMENTS

Figure 1:
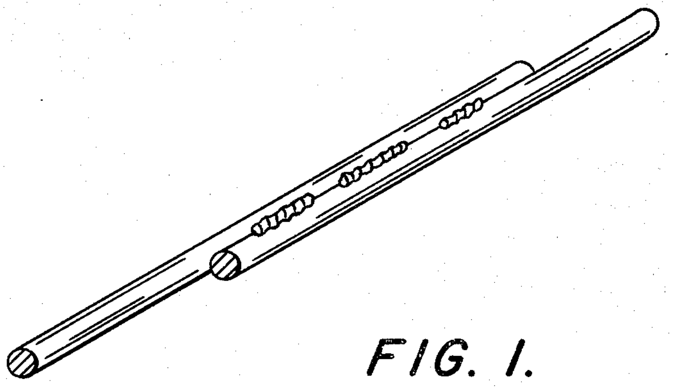
FIG. 1 illustrates a preferred weld geometry as may be used in the practice of this invention.

When a cylindrical vessel or pipe is internally pressurized, the load is transferred to the shell, i.e. vessel or pipe wall, and affects the wall by creating stresses therein. In a conventional solid-wall structure, the stress situation created varies with respect to the longitudinal axis and is expressed in terms of both longitudinal and circumferential stresses. As noted above, the circumferential stresses are exactly twice as large as the longitudinal stresses, because, due to the geometry of the cylindrical structure, there is twice as much surface presented to the pressure times cross sectional area load, and thus twice as much load carrying capacity in the longitudinal direction as in the circumferential direction. Therefore, in conventional pipe and vessel designs, longitudinal stress is of little importance, and the primary design considerations are focused on circumferential stresses.

In the case of cylindrical pressure vessels, the ends of the cylindrical section are normally closed with a cap or head. When a hemispherical head is used, a wall thickness one-half that of the cylindrical section would be adequate because the load in a spherical, i.e. hemispherical, wall is one-half the load in a cylindrical wall of the same diameter and thickness.

A disadvantage of the above relationship is that, with regard to the longitudinal stresses, the wall of every simple pipe or pressure vessel is twice as thick as is needed to carry the longitudinal stresses and the stresses in a hemispherical head. However, if the pipe or vessel is wrapped with reinforcement such as wire or the like, such that the reinforcement will carry half of the circumferential load, then the longitudinal and circumferential stresses in the wrapped structure will be equal, creating what is called a uniform biaxial system.

In simplest terms, the design of the optimum pressure vessel or pipe to have a uniform biaxial stress system, knowing the working pressure required, is to select a wall thickness that will carry one half of the required working circumferential stress, and add sufficient wire wrapping to carry the other half. The stronger the wire, the smaller the amount of wire that will be required. Thus, if the wire is three times as strong as the vessel or pipe shell material, as is common, an equivalent cross-sectional area of the wire wrapping need be only one-third the wall thickness of the shell to double the working pressure of the vessel or pipe. Although it is common practice to wrap the wire with a "thread" wrapping, i.e. a pitch as closely spaced as possible with each wire wrap hoop abutting the previous hoop, it is known that a spaced pitch will be equally satisfactory, provided of course, that a suitable combination of strength and wire cross-sectional area is provided. Of course, the hoops should not be spaced so far apart that the shell could fail therebetween. In this regard, the wire hoops are normally spaced apart by a distance of not more than four times the shell wall thickness. Accordingly, increasing the wire strength for a given diameter or increasing the wire diameter for a given strength will permit an increase in the wire pitch. In view of these considerations, it would then appear that if a given wire of uniform tensile strength and diameter were wrapped around a pressure vessel or pipe with a varied pitch, the tensile stresses in each hoop would vary depending on the pitch. Indeed, it has been verified that the closer the wire hoops are spaced, the more cross-sectional area of wire is provided and accordingly, the lower the tensile stresses in each hoop, assuming of course, a constant internal pressure. Accordingly the crux of this invention is based in part on varying the pitch in certain hoops of wire so that the tension in those hoops may be lowered, to thereby permit the use of welded anchors or splices.

In welding small diameter wires, as are commonly used in wrapping vessels and line-pipe, e.g. ¼-inch hard-drawn A227 wire, it has been thought that the heat input from welding would result in a substantially complete anneal of the wire so that the ultimate strength thereof would be reduced by a rather significant factor, e.g. about 50% in the case of hard drawn A227. I have found however, that adjacent contacting strands of ¼-inch wire can be welded together with a joint efficiency consistently better than 70% of ultimate strength, particularly when using Type 305 or 310 stainless steel welding electrodes on hard drawn A227 or hard drawn and stress-relieved A421. In fact 85% of ultimate strength is most common. FIG. 1 of the attached drawings illustrates a preferred weld to achieve such good joint efficiencies, without risking failure of the weld joint. In making a weld joint of this type, it is essential to avoid excessive heat input to the weld at the outboard points of the joints. In practice, the optimum weld appears to e to provide three weld deposits. First, a center weld deposit about two inches long and then two end deposits about ½inch long, spaced about two inches from the center deposit.

Figure 2:
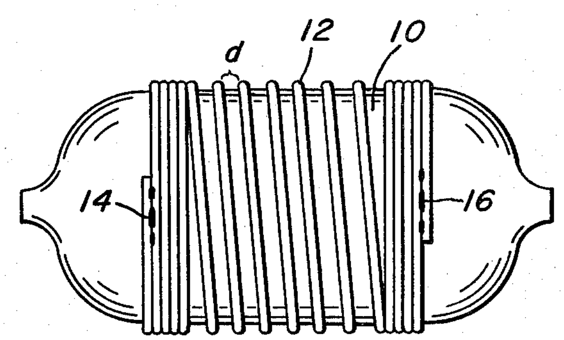
FIG. 2 is a plan view of a wire wrapped pressure vessel constructed in accordance with this invention.

To illustrate the application of this invention to pressure vessels, reference is made to FIG. 2 which shows a steel vessel 10, wrapped with wire 12. In accordance with well known procedures, the ends of the vessel 10 must of course be designed to withstand the design pressure. One common design is to form hemispherical heads as shown. This is usually done by starting out with a straight length of seamless pipe, and hot forging the ends down to a hemispherical configuration as shown.

To wrap vessel 10 as shown, it is preferable to mount it in a lathe or some other means where it can easily be rotated in place, and the wire is looped around one end of the vessel 10, at the point of tangency between the hemispherical head and the cylindrical body. At this point, a weld 14 is effected between the end of the wire and the adjacent first hoop as shown. The weld should not come into contact with the vessel 10. Although many different types of weld would be sufficient, it is of course preferable that efforts be taken to minimize the loss in wire strength due to welding. To this end, a weld as described above and shown in FIG. 1 is preferred. The weld 14 is accomplished with very slight or no tension whatsoever in wire 12. Although no tension is necessary, it is further obvious that there be no slack in the wire. Therefore, a slight amount of tension will assure that the wire is snuggly wrapped.

To start the winding and make the weld 14, I prefer to secure the free end of wire 12 to the lathe head (not shown) so that on rotation, the wire will wrap around the vessel under a slight tension. After the weld 14 is made, the excess end of the wire can be cut-off, just ahead of the weld as shown.

As noted above, the point of beginning the wire wrapping is preferably at the point of tangency between the hemispherical head and the cylindrical body, although a slight distance from the point of tangency down over the hemispherical head will be equally suitable. A limit to the extent that the starting point can be down over the hemispherical head is quickly reached by virtue of the fact that if this distance is excessive, the wire will easily slip off the end of the vessel. Consequently, it has been observed that approximately one or two wire diameters can be positioned beyond the point of tangency.

Once the weld 14 is made, vessel 10 is rotated and wire 12 allowed to wrap therearound with a thread pitch for several complete revolutions. Typically, I provide from 3 to 6 thread wrapped hoops, although more would not be harmful. After wrapping on several thread wrapped hoops, the pitch is changed to a preselected valve, so that there is a distance, d, between each hoop. Upon approaching the opposite end, i.e. opposite point of tangency, the wire pitch is again returned to a thread winding for several turns, preferably the same number of times as was used to start the winding. Again with little or no tension in the wire, the last two hoops are welded together with weld 16, and the excess wire cut free. Hence, the wrapping is finished in substantially the same manner as it was begun. At this point there is at most, only a small and insignificant amount of tension in the wire 12.

In order to suitably prestress the wire 12, the wrapped vessel 10 is hydrostatically pressurized to a predetermined prestressing pressure. This pressure must be sufficient to cause yielding of the cylindrical portion of vessel 10 in the circumferential direction only. There must of course be no yielding in the longitudinal direction or in the vessel heads.

From the above, it can be seen that in the resulting structure there is a greater wire density at the two ends of the winding due to the thread pitch these provided. This then adds additional localized constraints to the vessel in the vicinity of the welds. As a result the strain in the thread wound hoops is less than in other hoops in the mid-section of the vessel, and accordingly, the load on those hoops subjected to the weld is significantly lower than the load on the other hoops. Hence, any loss in strength in the wire due to the welds 14 and 16, will not adversely affect the pressure capacity of the finished vessel.

In addition to the above favorable result, it should be noted that insofar as the hemispherical heads of the vessel do not yield, they do provide reinforcement for the cylindrical portion of the vessel adjacent thereto. Hence, when the vessel is prestressed by autofrettage, there is no yielding in the cylindrical wall at the point of tangency. Moving away from the point of tangency along the cylindrical wall, there is successively greater yielding until, after a few inches, typically about 5 inches, or about 5 to 10 times wall thickness, a maximum strain is achieved. It naturally follows that the load, and therefore the degree of prestress transferred to the wrapped wire 12 will vary considerably from a high level of prestress at the vessel mid-section to a rather low level of prestress as the welded ends above the point of tangency. Accordingly, those hoops of wire subjected to welding are doubly protected against high stress, first by the higher wire density adjacent to the weld and second by the reinforcing nature of the vessel heads. Since the wire subjected to the weld should retain at least 50% of its original ultimate strength, and ideally as much as 85%, the reduced stresses in these wire hoops will more than compensate for the reduced strength. It can further be seen that since the hemispherical heads reinforce the ends of the cylindrical vessel to minimize stresses in the wire hoop subjected to welding, it is not always necessary to provide the secondary protection of a greater wire density at the point of tangency. For some applications therefore there need not be a variable pitch in the reinforcing wire, and one may use a thread pitch all the way across the vessel.

Figure 4:
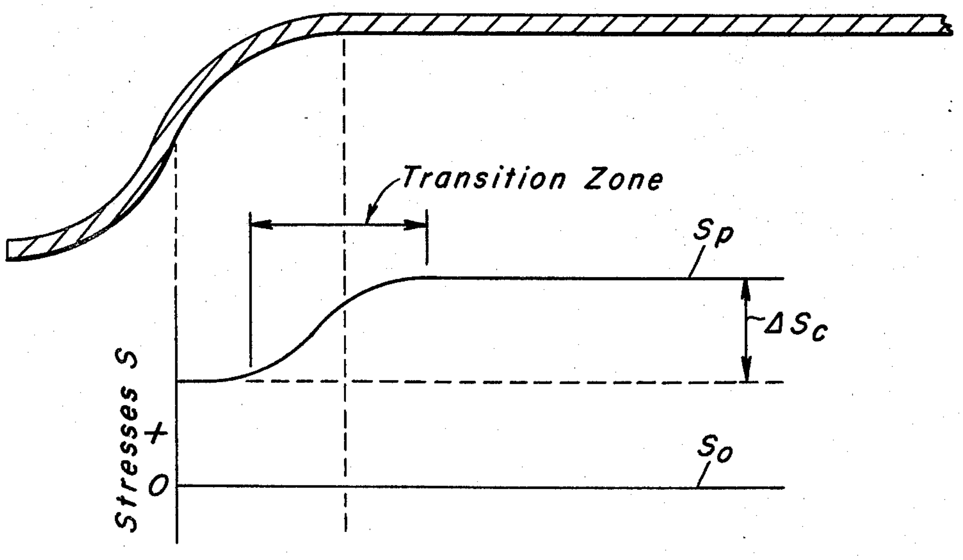
FIG. 4 is a graph plot with reference to a section of an unreinforced pressure vessel showing stress relationships at various portions of the vessel section.

As noted above, the reinforcing nature of the hemispherical heads causes a transition in stresses in the vessel wall. This transition is graphically illustrated in FIG. 4 for a pressure vessel not wire wrapped. At zero internal pressure there are no stresses in any section of the vessel wall as depicted by the line So. When the vessel is subjected to a large internal pressure, variable stresses are created in the vessel wall as depicted by the line Sp. At the tip of the vessel and outer portion of the hemispherical head, the stresses are at a minimum.

Then at a point about midway up the hemispherical head, the wall stresses begin to increase abruptly, until at some point beyond the point of tangency, a maximum stress is shown for the cylindrical wall portion. This area where the stresses are increasing is identified as the transition zone. The change in stresses through this transition zone is identified as $AS_c$. This rather abrupt change in stress may be disadvantageous in that upon repeated loading, it will decrease the fatigue life of the vessel in this transition zone.

Figure 5:
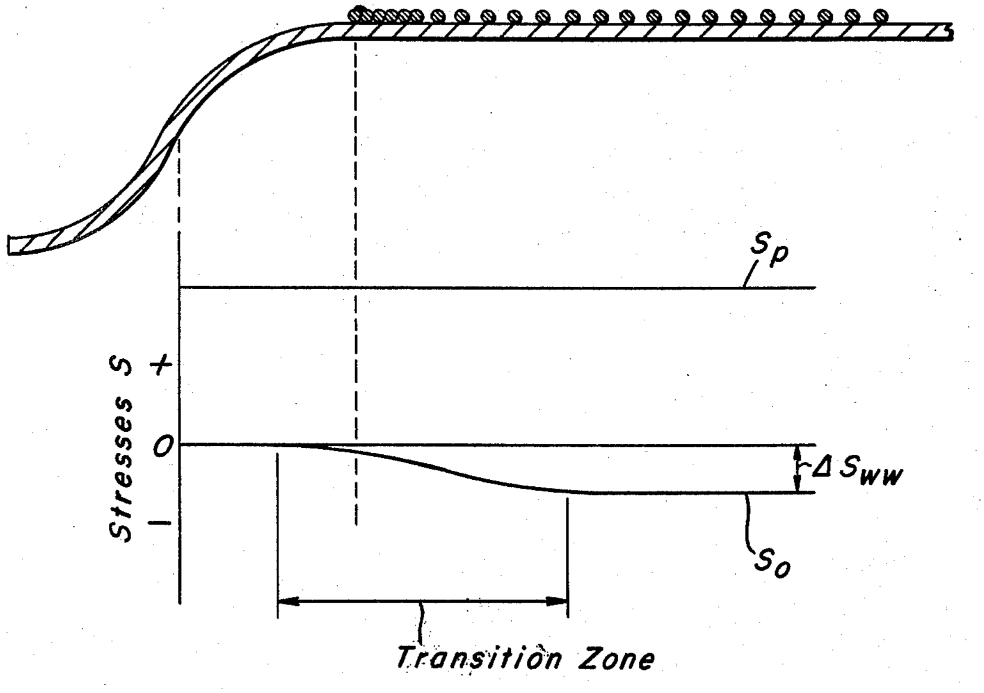
FIG. 5 is substantially like FIG. 4 showing the stresses in a wrapped pressure vessel.

A wire wrapped pressure vessel in accordance with this invention offers another advantage in that the vessel fatigue life is increased, because it reduces the abruptness of stress change in this transition zone. This can be seen by reference to FIG. 5 where stress relationships are shown for a wire wrapped vessel prestressed by autofrettage. Here it is seen that at zero internal pressure, the vessel walls are subjected to a compressive or negative stress depicted by line So. When the vessel is subsequently subjected to its design internal pressure, the stresses in the head and cylindrical wall are uniform, as depicted by line Sp. As shown in the graph, the stress change through the transition zone ΔSww is less than that for the unwrapped vessel ΔSc. In addition, the transition zone is wider for the wrapped vessel than for the unwrapped vessel. Accordingly, for each cycle of pressurization, the shell-to-head transition over the indicated transition zone at and surrounding the point of tangency undergoes a lesser stress range change, over a wider area which will enhance fatigue life.

Figure 3:
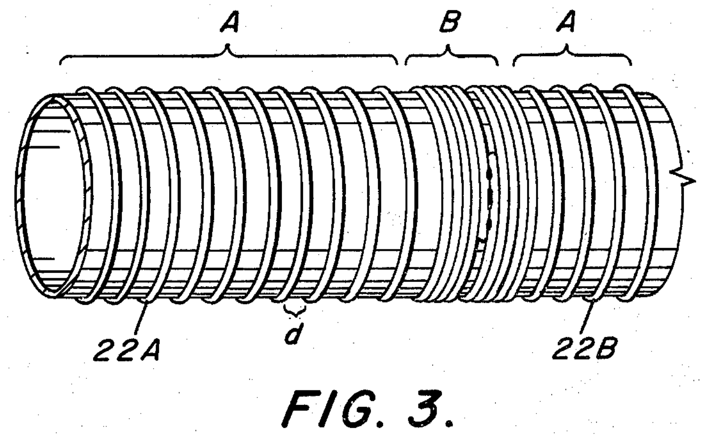
FIG. 3 is a plan view of a wire wrapped line pipe constructed in accordance with this invention particularly emphasizing the splice between two wire lengths.

To illustrate the application of this invention to line pipe, reference is made to FIG. 3 which depicts a short section of pipe 20 wrapped with wire 22. At the left end of the pipe identified as length A, wire 22A is wrapped around the pipe with a pitch sufficient to space apart each hoop by a distance, *d*. Since the pipe cannot be subsequently strained, or at least not easily strained in the field, the wire 22A must be wrapped with a preselected tension. The wire must of course be preselected to have a sufficient combination of strength and diameter to withstand the load for which it is designed. Although the degree of tension may vary, it is common practice to wrap the unpressurized pipe with a tension in the wire sufficient to provide approximately 30% of the wire's ultimate strength. In subsequent use then under maximum internal pressure, the wire tension will increase to about 60% of its ultimate strength.

As long as a continuous strand of wire 22A can be wrapped around pipe 20, a constant pitch and tension, as described above, is provided. As the end of wire 22A is approached, and hence the need to splice a new wire thereto, the pitch is changed to provide a thread winding for at least about 3 or 4 hoops. At the same time, the tension in the wire is reduced to a lower level. For example, if the tension in the wire wrapped with an open pitch had been at 30% of ultimate strength, the first two windings of the thread pitch should be made at say 15% of ultimate strength, and the next loop or two at about 5% of ultimate. At this point, a new wire 22B is welded to wire 22A with weld 24, preferably as described above. The weld 24 may be made with no tension in the last hoop of wire 22A and after the weld is completed, tensioned as desired.

In winding wire 22B onto the pipe, the winding is commenced as the winding of wire 22A was terminated. That is, a thread winding is used for several complete revolutions, starting with a low tension to match the final tension in wire 22A. Eventually, the pitch is changed to space the hoops apart by a distance, *d*, as before, and matching tension. Thereafter, the wire 22B is wrapped as was wire 22A until again when another splice is needed and made as before.

From the above description, it is seen that there is a greater wire density on either side of the weld splice, area B. This then adds additional localized constraint to the pipe in the vicinity of the weld, and particularly to those hoops weakened by the welded splice. The added constraint however, limits the strain on those thread wrapped hoops when the pipe is pressurized, and hence the strain in those strands is minimized.

In the above description, the specific numerical values given were merely exemplary. To better illustrate the relationships involved, it must first be remembered that the stress in the wire in the critical area of the weld must be reduced well below the maximum allowable. Hence, the total wire stress, $S_w$, is the sum of the original wire prestress, i.e. wrapping tension, $S_{wo}$, plus the increased tension upon loading, $\Delta S_w$. Thus, $S_w = S_{wo} + \Delta_{Sw}$. As stated above, the original wire prestress, $S_{wo}$, by proper selection of the density of the thread wrapping and wrapping tension near the splice, can be established at a very low level, say 5% as exemplified above. Concurrently, this selection of wire density creates an effectively heavier wire layer equivalent thickness; $A_w$, in that vicinity, which has an influence on $\Delta S_w$ expressed as follows:

$$\Delta S_w = \frac{E_w}{E_s}\left(\frac{PR}{t_s + A_w} - \mu S_1\right)$$

where:

P = design working pressure, psi

R = radius of pipe section, in.

*t* = thickness of shell, in.

$A_w$ = effective cross-sectional area of wire per inch of vessel length expressed in terms of thickness, in.

$\mu$ = Poisson's Ratio

Sl = longitudinal stresses in shell, psi $E_w$ = modulus of elasticity of wire $E_s$ = modulus of elasticity of shell The combination of wire wrapping tension and thread-wrap density is selected so that the sum of $S_{wo}$ and $\Delta S_w$ is less than the joint strength of the welded splice by a suitable margin.

EXAMPLE

To illustrate one specific example of the first described embodiment, i.e. a pressure vessel, a test pressure vessel was produced for experimental work. This vessel consisted of an interior steel shell having an outside diameter of 16 inches and a 0.301-inch-thick wall, having an overall length of 63 inches. Hemispherical heads on each end with integrally forged neck openings on each end protruding about 3 inches. These end necks were drilled and tapped to allow plugs or fittings. The vessel was made from X-52 seamless steel pipe. No welding was done in fabricating the vessel. The wire used to wrap the vessel was ASTM A227 Class III, hard-drawn high-carbon steel spring wire. The design of the vessel was based on specifications which provide that the working pressure of the vessel shall be 3/5 of a test pressure, and that the maximum allowable stress at the test pressure would be 70 ksi or 70% of the ultimate tensile strength, whichever is smaller. The results of a longitudinal tension test made on the same material from which the vessel was made, were as follows: 0.5% extension yield strength 52, 115 psi; ultimate tensile strength 75, 460 psi; elongation in 2 inches 40.0%. On the basis of these results, the minimum ultimate strength was taken as 70,000 psi. Based on the specification requirements, the design working pressure for this vessel would be 1110 psi. The design working pressure for the composite wire-wrapped vessel is 2250 psi, twice that of the unwrapped vessel. Since the specification requires that the test pressure be 5/3 of design pressure, this would require a test pressure of 3750 psi. The design of the test vessel was based on an arbitrarily selected bursting pressure of 1.25 times the test pressure, or 4700 psi.

On the basis of the above, the amount of wire to be applied to the vessel was selected on the basis of the equation:

$$P_b R_i = A_w S_{wu} + S_s T_s$$

where:

Pb = burst pressure of composite vessel $R_i$ = inside radius of vessel $A_w$ = total cross-sectional area of wire applied to the vessel per inch of length $S_{wu}$ = ultimate tensile strength of wire $S_s$ = yield strength of wire $T_s$ = thickness of shell.

It can be seen from the above equation that, inasmuch as the wire has a very high yield strength (approx. 220,000 psi) in comparison with the vessel steel (52,000 psi), upon application of the pressurization load ($P_b R_i$), that the resistance to this load is made up from the wire component ($A_w S_{wu}$) and the shell component ($S_s T_s$). As the load is increased to the full bursting load ($P_b R_i$), the shell load will increase to only to the yield strength of the shell, after which this component will contribute no additional load-carrying capacity. Hence, the shell will stretch underneath the wires at about 52,000 psi. At this point and thereafter, the load on the wire component ($A_w S_{wu}$) will increase rapidly until the utimate strength of the wire component ($S_{wu}$) is reached, upon which the wire will break and the shell burst. Thus, the amount of wire applied, i.e. the cross-sectional area applied per inch of vessel ($A_w$) is directly determined by the arbitrarily selected bursting pressure for the vessel. For this test vessel, the area of wire was determined at 0.100 square inch per inch of 0.192-inch-diameter wire. Dividing this by the cross-sectional area of an individual wire (0.0289 sq. in.) is equivalent to 3.46 wires/inch. Hence, the wire spacing was determined to be 0.2895 inch center-to-center.

With the above parameters, the vessel was wrapped substantially as described above applying a slight tension on the wire, the weld deposit was made with 305 stainless electrodes substantially as described above.

When completed, the vessel was pressurized above the design working pressure and above its required test pressure to a preselected pressure of 4000 psi. This prestressing pressure was selected to be sufficient to cause permanent yielding of the shell under the wires to the extent that upon subsequent repressurization to the design pressure of 2250 psi, or the test pressure of 3750 psi, the wrapped vessel would undergo no further plastic deformation, and that the amount of prestress remaining in the wire after relaxation of pressure would be within specification limits.

Strain-gage instrumentation was attached to one such vessel prior to pressurization. The readings obtained indicated that the stresses developed in the wire and shell were as predicted. Of primary importance was the result that the measured strain in the wire at the point of the welded wire was somewhat less than one-half the strain measured in the wires at the vessel mid-section. Thus, as expected, although stresses in the wires at the vessel mid-section attained stresses as high as 85% of ultimate strength at the prestress pressure, none of the welds failed. This was due, of course, to the fact the weld was stressed only to about 30 to 35% of the ultimate strength. The vessel was subjected to repeated repressurization of 3750 psi with no failure.

In subsequent burst tests, the wire at the vessel mid-section reached its yield strength of about 200,000 psi at approximately 4200 psi internal pressure. At this point the end welded wires were stressed to about 100,000 psi. As the pressure was increased beyond 4200 psi, the shell and wires at the vessel mid-section yielded rapidly with the wire approaching its ultimate strength of 252,000 psi. Due to wire straining at the vessel mid-section, the load on the welded end wires increased rapidly. Eventually, the wire at the weld failed at about 5100 psi internal pressure. At an internal pressure of 5100 psi, failure was imminent in the wires at the mid-section, so that failure could have occurred there as readily.

I claim:

1. A process for reinforcing the cylindrical wall portion of pressure vessels and pipes, the steps comprising selecting a wire of sufficient strength and diameter as will provide the desired reinforcement when the wire is wrapped around said wall portion with a preselected open pitch, securing one end of said wire to the wall portion by welding the end of the wire to the adjoining wire hoop such that the weld deposit does not contact the wall portion, wrapping said wire around the wall portion such that the wire is wrapped with the preselected open pitch except adjacent to the welded end whereat at least about 3 thread pitch windings are provided so that there is a greater wire density adjacent to the weld, and providing a significantly greater tension in the open pitch windings than in the thread pitch windings.

2. The process of claim 1 in which that portion wire wrapped with a predetermined open pitch is provided with a tension no greater than about 60% of the wire's ultimate strength.

3. The process of claim 2 in which the wire wrapped with a thread pitch is provided with a tension of about 5% of the wire's ultimate strength in those windings subjected to the weld and a tension of about 30% of the wire's ultimate strength in the thread pitch windings adjacent thereto.

4. The process of claim 2 in which said tension is provided after the cylindrical wall portion has been wrapped by subjecting the wall portion to a sufficient internal pressure as will cause the wall portion to yield against the wound wire.

5. The process of claim 4 in which said cylindrical wall portion is a portion of a pressure vessel having hemispherical heads.

6. A process for reinforcing the cylindrical wall portion of a pressure vessel, the steps comprising selecting a wire of sufficient strength and diameter as will provide the desired reinforcement when the wire is wrapped around said wall portion with a preselected open pitch, wrapping said wire around said vessel at one end of said wall portion to provide at least two thread pitched hoops without any significant tension therein, welding the first two hoops together, wrapping at least two more hoops around said wall portion with a thread pitch without significant tension in the wire, thereafter wrapping the wire around the wall portion with the preselected open pitch without significant tension in the wire, continuing said wrapping until the opposite end of said cylindrical wall portion is approached, thereafter wrapping said wire around said wall portion with a thread pitch providing at least three closed pitch hoops, at the end of said wall portion welding the last two hoops together, cutting the excess wire from the wrapped structure near the weld, pressurizing the wrapped vessel to a preselected prestressing pressure sufficient to cause the cylindrical wall portion to strain circumferentially against the wrapped wire thereby stressing said wire wrapped with the open pitch to a level no greater than about 60% of its ultimate strength whereby said wire wrapped with a thread pitch will be stressed to a level somewhat below 60% of its ultimate strength.

7. A process according to claim 6 in which said thread pitch hoops subjected to the weld are stressed to a level no greater than about 5% of the wire's ultimate strength, and the thread pitch hoops adjacent thereto are stressed to a level no greater than about 30% of the wire's ultimate strength.

8. A process according to claim 6 in which the entire length of wire is wrapped with a thread pitch.

9. A process according to claim 6 in which said vessel is provided with hemispherical heads, and the welded joint is provided over the point of tangency between the head and the cylindrical vessel wall.

10. A process according to claim 6 in which said vessel is provided with hemispherical heads, and the weld joint is provided down over the hemispherical head by a distance not greater than about two wire diameters from the point of tangency between the head and the cylindrical vessel wall.

11. In the process of reinforcing a line pipe whereby a wire is progressively wrapped around said pipe with a predetermined open pitch, and with a predetermined tension therein, a method of splicing a second wire onto the end of a completely wrapped first wire comprising wrapping the first wire onto said line pipe at said predetermined open pitch and predetermined tension therein until the end of said wire is approached, thereafter wrapping said first wire with a thread pitch and at a reduced tension which is less than said predetermined tension for at least about 3 full turns before the end of the wire is reached, welding the end of the second wire adjacent to the end of the wrapped first wire, wrapping the new wire onto the line pipe with a thread pitch and at the same reduced tension for at least 3 full turns, and thereafter wrapping the second wire with the same predetermined open pitch and predetermined tension as was the first wire.

12. A method according to claim 11 in which said wire wrapped at said predetermined pitch is stressed to a value no greater than about 60% of the wire's ultimate strength, and the wire wrapped with a thread pitch is stressed to a value no greater than about 30% of the wire's ultimate strength.

* * * * *